United States Patent [19]

Rosenfeld

[11] Patent Number: 4,668,984
[45] Date of Patent: May 26, 1987

[54] OPTICAL PATTERN GENERATION TECHNIQUE

[75] Inventor: Jerome P. Rosenfeld, Collingswood, N.J.

[73] Assignee: RCA Corporation, Princeton, N.J.

[21] Appl. No.: 813,398

[22] Filed: Dec. 24, 1985

[51] Int. Cl.$^4$ .............................................. H04N 7/18
[52] U.S. Cl. ................................... 358/107; 356/376; 382/28
[58] Field of Search ...................... 358/93, 107; 382/8, 382/12, 19, 28; 350/99, 266, 273, 270, 275, 602, 634; 356/376, 387, 383, 445

[56] References Cited

U.S. PATENT DOCUMENTS

| | | | |
|---|---|---|---|
| 3,488,102 | 1/1970 | Buck et al. | 350/7 |
| 3,818,444 | 6/1974 | Connell | 340/146 |
| 4,480,919 | 11/1984 | Asano et al. | 356/376 |
| 4,573,073 | 2/1986 | Corby | 358/107 |
| 4,593,967 | 6/1986 | Haugen | 356/376 |

Primary Examiner—Michael A. Masinick
Attorney, Agent, or Firm—Clement A. Berard; Robert L. Troike; Raymond E. Smiley

[57] ABSTRACT

A rotatable drum is arranged around a surface lying generally parallel to the axis of rotation, a plurality of bar code patterns, the individual bars making up each pattern extending normal to the rotational axis. A light beam in a plane is projected onto the surface, the plane lying generally parallel to the rotational axis such that light strikes the surface. A light beam also in a plane is reflected from the surface, the beam having relatively light and relatively dark regions corresponding to the particular bar code patterns upon which the projected beam is imaged. The reflected beam is passed through a cylindrical lens which fans the reflected beam into a wedge shaped beam projecting onto an object in the path of the beam successive bar patterns as the drum rotates.

7 Claims, 2 Drawing Figures

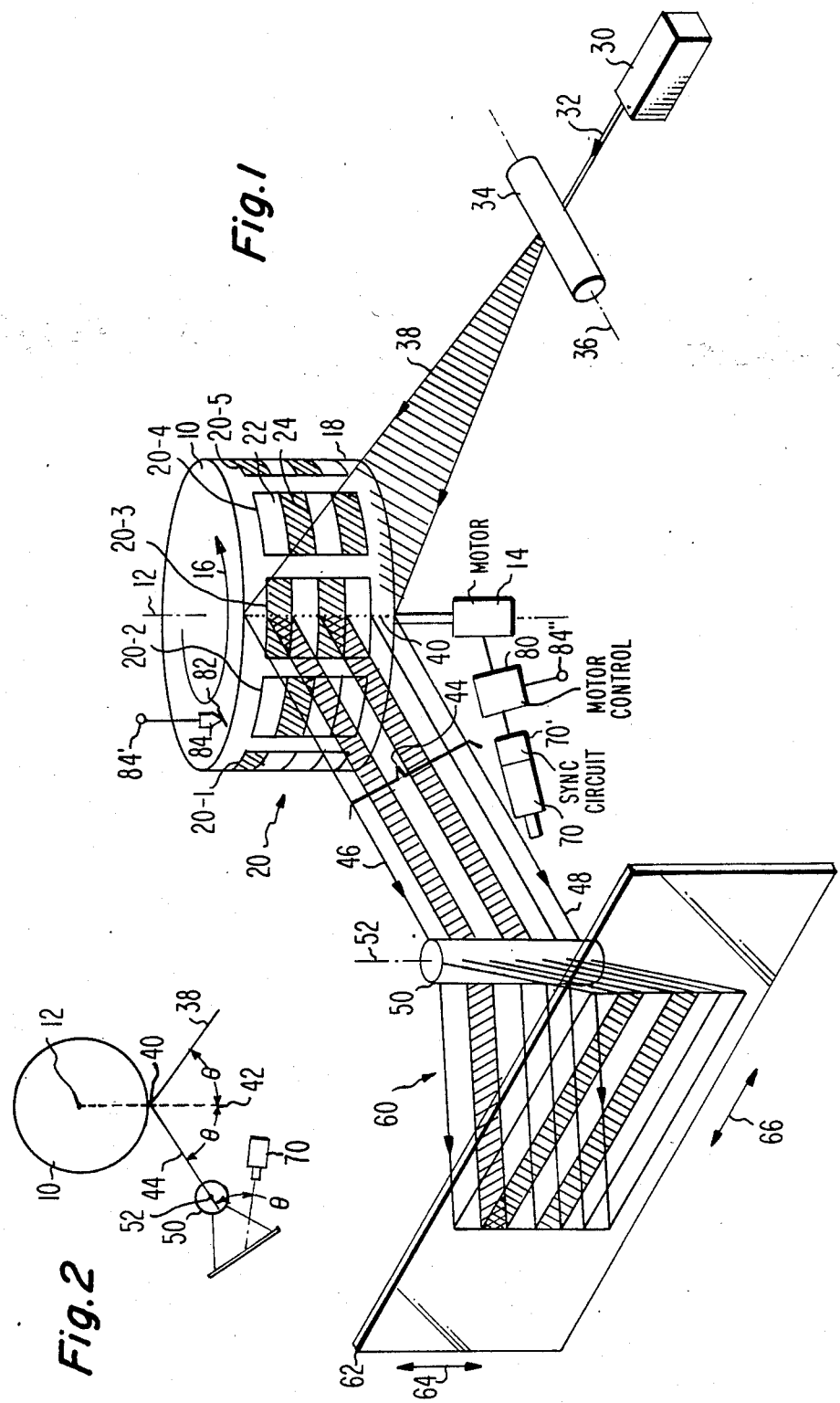

OPTICAL PATTERN GENERATION TECHNIQUE

The Government has rights under this invention pursuant to Contract No. 1,04230-84-D-0929 awarded by the United States Postal Service.

BACKGROUND OF INVENTION

1. Field of Invention

This invention is concerned with techniques for producing a plurality of optical patterns and more particularly with a technique for rapidly changing the optical patterns.

2. Description of the Prior Art

There is a need to image multiple optical patterns on an object for the purpose of ranging to the object. The ranging is useful, for example, in robotics applications where it is desired to know the distance from one object, such as a robot arm, to an object to be manipulated thereby. Typically the patterns in such an imaging system are bar codes with varying spatial frequencies from one pattern to another. One prior art solution to create such bar code patterns is the use of a film projector and an endless film strip with successive film frames having different optical patterns. The problem with such a system is that the film projector, having many mechanical parts, quickly wears out and the film, typically mylar film, breaks.

A second solution is the use of a light modulator such as a liquid crystal array. This has the distinct advantage over the film projector-film arrangement in that there are no moving parts. However, liquid crystals change optical patterns only relatively slowly and the types of liquid crystal arrays suitable for creating optical images are very expensive, of the order of fifty thousand dollars.

SUMMARY OF THE INVENTION

A system for imaging, on an object, a plurality of different bar codes in succession, comprising in combination, a rotatable drum having an axis of rotation and having a face parallel to the axis of rotation, the face including a plurality of bar code patterns, each comprising relatively reflective portions alternating with relatively nonreflective portions, the bars lying at right angles to the axis. The system further includes means for projecting on said bar patterns a light beam in a plane, the plane being parallel to the axis and means receptive of the light pattern in the form of a plane reflective from the drum for fanning out the beam into a wedge shaped image of bars corresponding to the bars on the face, whereby, as the drum rotates, successive bar code patterns are imaged on an object in the path of the wedge shaped image.

BRIEF DESCRIPTION OF THE DRAWING

FIG. 1 is an optical pattern generation system in accordance with a preferred embodiment of the present invention; and FIG. 2 is a plan view of a portion of FIG. 1 useful in illustrating positional and angular relationships of certain parts of FIG. 1.

DETAILED DESCRIPTION OF A PREFERRED EMBODIMENT

Referring now to FIG. 1, a drum 10 is rotatable about axis 12 by a motor 14 in the direction of arrow 16. On the face 18 of drum 10, which is parallel to axis 12, are positioned a plurality of different bar patterns 20, five such patterns, 20-1, 20-2 . . . 20-5 being illustrated by way of example. Each pattern comprises a plurality of alternating relatively reflective elongated bars such as 22 and relatively nonreflecting elongated bars such as 24. The bar patterns are oriented such that the length dimension of the individual bars is normal to axis 12.

A source 30 of a narrow collimated beam of light directs the light beam 32 toward and through a cylindrical expanding lens 34 having an axis 36. Source 30 may typically take the form of a laser light.

A cylindrical lens has a curvature in one direction only which causes a light beam directed toward and in the direction normal to axis 36 to fan out in one direction only, that direction being normal to axis 36 as indicated by beam 38. The beam lies substantially in a plane (not shown) which is normal to axis 36. The only thickness of beam 38 normal to the plane, that is, parallel to axis 36, is the thickness of the beam emerging for source 30, altered by any distortion in lens 34.

Beam 38 strikes surface 18 of drum 10 along dotted line 40. As illustrated in FIG. 1 line 40 is in line with axis 12. Turning for a moment to FIG. 2, the relative positions of axis 12 and line 40 (each illustrated as a point in FIG. 2) is illustrated along with the angle $\theta$ 38 impinges on drum 10 relative to a plane illustrated as a dashed line 42 passing through axis 12 and line 40. A typical angle $\theta$ is 20°.

Returning to FIG. 1, beam 38, upon striking surface 18, reflects off surface 18 in accordance with the pattern upon which beam 38 impinges. The reflected beam 44 lies substantially in a single plane passing through lines 46 and 48 marking the upper and lower surfaces of the pattern on face 18 (as illustrated in FIG. 1). It will be realized that, due to the cylindrical shape of surface 18, and due to the fact that beam 38 has some width, beam 44 does not lie entirely in a plane but rather is somewhat wedge shaped. The angle of the wedge depends on the thickness of beam 32 and the diameter of drum 10. The thicker the beam 33 and/or the smaller the diameter, the longer will be the size of the wedge in beam 44.

A second expanding cylindrical lens 50 having axis 52 is positioned to intercept beam 44. Axis 52 is parallel to face 18 and to line 40. Referring momentarily to FIG. 2, the relationship of beams 38 and 44 and the relationship of cylindrical lens 50 and more particularly axis 52 thereof (illustrated as a point in FIG. 2) in relation to line 40 and axis 12 is illustrated. In particular the beam 44 is reflected from surface 40 at an angle $\theta$ relative to center line 42. Beam 44 upon passing through lens 50 fans out into a wedge shaped beam generally illustrated as 60 and impinges on any object in its path. A transparent plate 62 is illustrated for purposes of drawing clarity. Typically object 62 would be opaque and of some thickness, a magazine or a newspaper being an example of a typical object. The pattern appearing on object 62 at any particular time corresponds to the particular pattern 20 upon which beam 38 is impinging at that particular instant in time. The pattern appearing on object 62 may be wider or narrower in the direction indicated by double ended arrows 66 than is the width of pattern as appearing on drum 10. The dimension in the direction of double ended arrow 66 will depend on the distance that object 62 is from lens 50, the further away the object the larger will be the image as appearing on object 62. A television camera 70 is arranged to receive a reflective image from object 62. Camera 70 is portioned, for example, in line width drum 10 and at an angle $\phi=20°$ relative to object 62 (see FIG. 2), although the exact placement is not critical. Camera 70 or associated electronics contains synchronizing circuitry 70' the purpose of which is to control the television frame rate at which camera 70 views the patterns on object 62, a rate of 30 frames per second being typical. That same synchronizing circuitry 70' is also connected to a motor control 80. The output of motor control 80, is in turn, coupled to motor 14 to control its rotational speed and therefore the speed of drum 10. A line 82 and pick up circuit 84 determine the rotational position of drum 10. The output of pick up circuit 84 is also connected to motor control 80 via terminals 84' and 84". The connection is not shown for drawing clarity.

In operation the speed of motor 14 and thus of drum 10 is synchronized to the frame rate of camera 70 such that when camera 70 is viewing object 62 a bar pattern such as that illustrated is being projected onto object 62 and when camera 70 is in the blanking interval between frames, beam 38 is directed to surface 18 at a position between successive patterns. The angular position of drum 10 is determined by pick up circuit 84 and line 82. Because of the position of lenses 34 and 50 and source 30 relative to drum 10 and object 62, camera 70 always views a stationary bar pattern on object 62, the pattern changing only during the blanking interval of the camera. Utilizing information provided due to the changing bar patterns as drum 10 rotates, equipment (not shown) can determine the distance of object 62 from some arbitrary location such as from camera 70 for purposes of enabling object 62 to be thereafter manipulated in some desired fashion.

What is claimed is:

1. A system for imaging, on an object, a plurality of different bar code patterns in succession, comprising in combination:
   a rotatable drum having an axis of rotation and having a face generally parallel to said axis of rotation, said face including a plurality of bar code patterns arranged around said face, each pattern comprising relatively reflective portions alternating with relatively nonreflecting portions, the successive reflective and nonreflective portions lying along a line generally parallel to said axis;
   means for projecting, onto said face, a light beam in a plane, the plane being parallel to the axis; and
   means receptive of the light pattern in the form of a plane reflected from the drum corresponding to the pattern of bars for fanning out the beam into a wedge shaped image of bars corresponding to the bars on said face whereby as said drum rotates successive bar code patterns are imaged on an object in the path of said wedge shaped image.

2. The combination as set forth in claim 1 wherein said means projecting a light beam comprises a source of collimated light and a cylindrical lens, said source directing said said light to said cylindrical lens, the light output of said lens lying in said plane.

3. The combination as set forth in claim 1 wherein said means receptive of said light patterns comprises a cylindrical lens.

4. The combination as set forth in claim 2 wherein said means receptive of light patterns comprises a second cylindrical lens.

5. The combination as set forth in claim 1 further including means for receiving images of said bar code patterns reflected from said object as said drum rotates.

6. The combination as set forth in claim 5 wherein said means receiving images of said bar code patterns comprising a television camera.

7. The combination as set forth in claim 6 wherein said rotatable drum further includes a motor for rotating said drum and wherein said system further includes means correlating the speed of said motor with the frame rate of said television camera such that when the transition from one bar code pattern to the next is imaged on said object, said television camera is in its blanking interval.

* * * * *